No. 811,319. PATENTED JAN. 30, 1906.
W. P. O'BRIEN.
RAILWAY SWITCH.
APPLICATION FILED JULY 24, 1905.
2 SHEETS—SHEET 2.
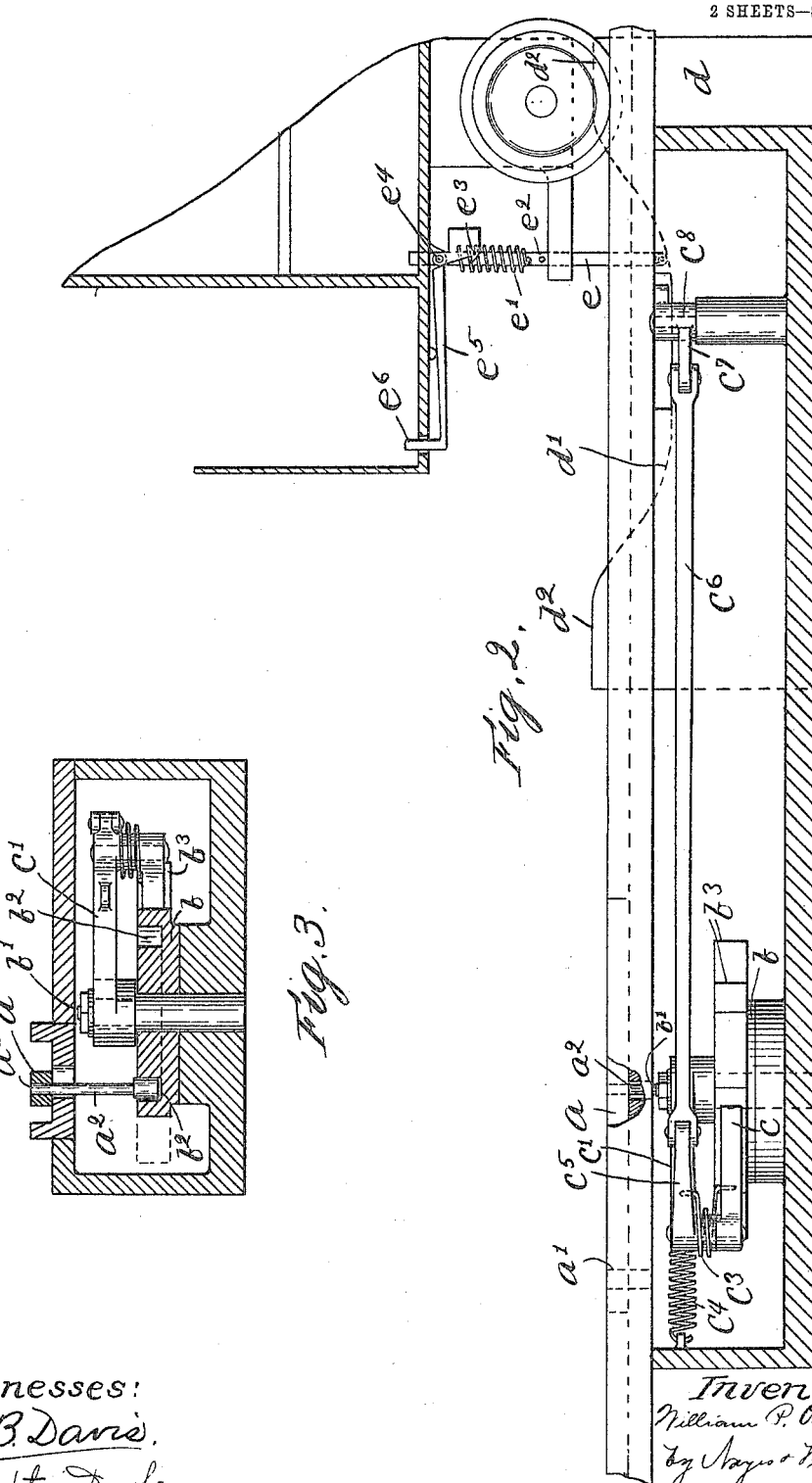
Witnesses:
H. B. Davis.
Cynthia Doyle
Inventor:
William P. O'Brien
By Sayres & Harriman
Attys.

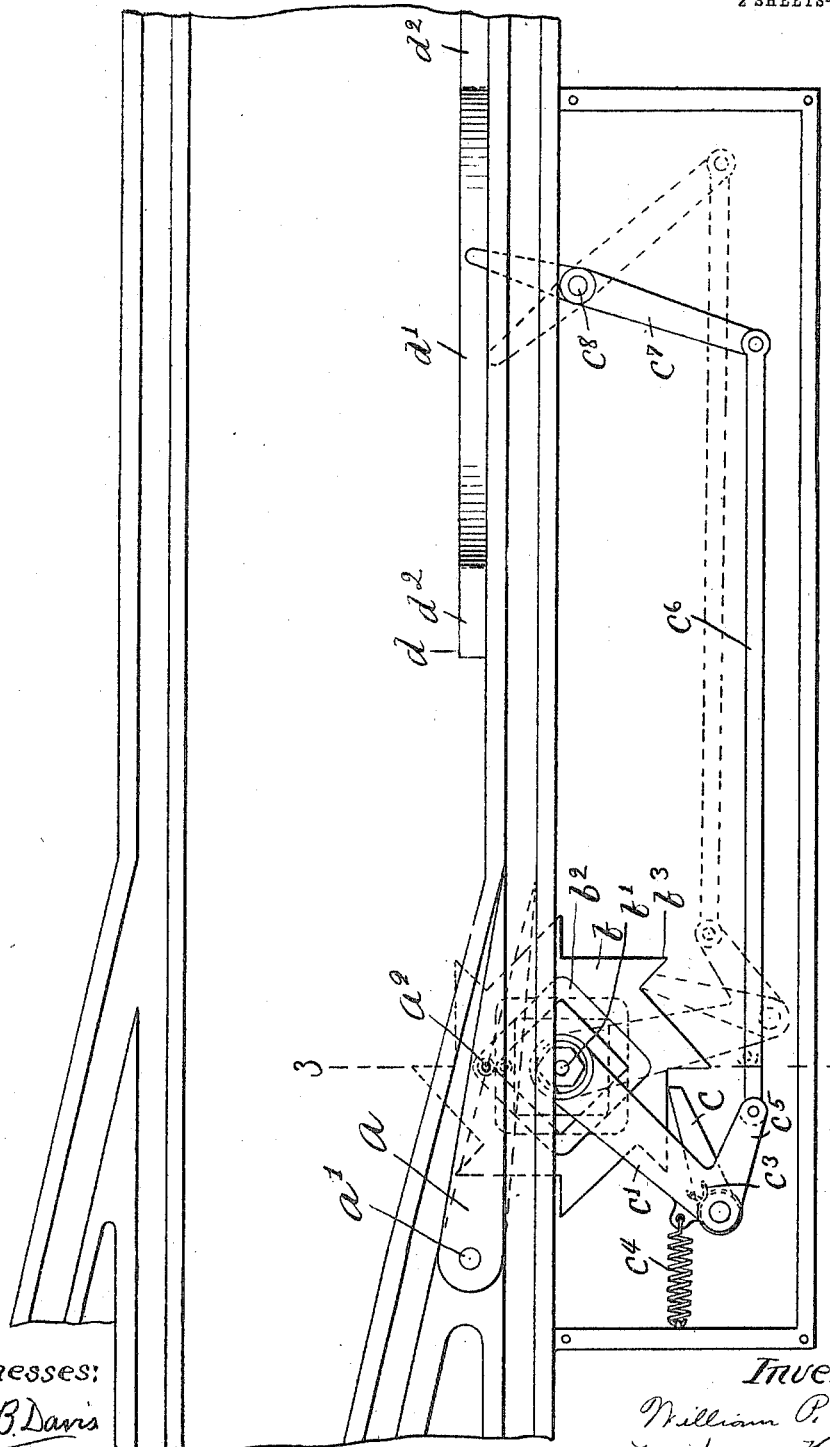

UNITED STATES PATENT OFFICE.

WILLIAM P. O'BRIEN, OF SALEM, MASSACHUSETTS.

RAILWAY-SWITCH.

No. 811,319.　　　Specification of Letters Patent.　　　Patented Jan. 30, 1906.

Application filed July 24, 1905. Serial No. 270,941.

*To all whom it may concern:*

Be it known that I, WILLIAM P. O'BRIEN, of Salem, county of Essex, State of Massachusetts, have invented an Improvement in Railway-Switches, of which the following description, in connection with the accompanying drawings, is a specification, like characters on the drawings representing like parts.

This invention relates to railway-switches, and has for its object to provide improved means for moving the switch-arm back and forth on its pivot, which is adapted to be operated by means controlled by the motorman of an electric car.

The invention consists in the combination, with a pivoted switch-arm, of an intermittently-movable cam-grooved disk in engagement therewith for moving it back and forth on its pivot, means for moving said disk, an actuating-lever, and an operating device on the car adapted to be operated by the motorman to operate said actuating-lever.

Figure 1 shows in plan view of a railway-switch embodying this invention. Fig. 2 is a side elevation and partial section of the railway-switch shown in Fig. 1 and operating device therefor. Fig. 3 is a transverse section of the switch-arm and means for moving it back and forth on its pivot, taken on the dotted line 3 3, Fig. 1.

$a$ represents a switch-arm, which may be of any usual or suitable construction. The switch is pivoted at $a'$. The switch-arm has secured to its under side a pin $a^2$, which extends down through a hole in the rail into a chamber which is provided beneath the rail. A cam-grooved disk $b$ is contained in said chamber, which occupies a horizontal plane and is adapted to be turned on an upright stud or post $b'$ as a pivot, thereby moving on a vertical axis. The disk is so located with respect to the switch-arm that the pin $a^2$, which projects downwardly therefrom, enters the cam-groove $b^2$ in said disk. The cam-grooved disk is thus in engagement with the switch-arm. The cam-groove in said disk is so shaped as to move the switch-arm back and forth on its pivot as the disk revolves. The cam-groove $b^2$ is herein shown as substantially square, so that as the disk is intermittently turned on its pivot in the same direction the switch-arm will be moved back and forth eight times or four complete excursions. The periphery of the disk $b$ is cut to form ratchet-teeth $b^3$. The ratchet-teeth are formed on the periphery of the disk $b$ for simplicity of construction; but it is obvious that they may be formed on a separate disk, which will be secured to the disk $b$. The ratchet-toothed disk is engaged by a pawl $c$, pivoted to a pawl-carrying arm $c'$ and held pressed into engagement with the ratchet-teeth by a spring $c^3$. The pawl-carrying arm is mounted to swing on the post $b'$ as a center and is held in its retracted position by a spring $c^4$ and is adapted to be advanced intermittently, so that the pawl will move the ratchet-wheel step by step. As the cam-grooved disk is herein shown adapted to move the switch-arm eight times, or four complete excursions, the ratchet-wheel will be provided with eight teeth, there being one tooth for each movement of the switch-arm. The pawl-carrying arm $c$ has another arm $c^5$ projecting from it, which is connected by a link $c^6$ with one end of the actuating-lever $c^7$, pivoted at $c^8$ at a point intermediate its length, so that as the lever is swung on its pivot the pawl-carrying arm will be operated. The link $c^6$ extends along the chamber which is provided beneath the rail, and the actuating-lever is pivotally supported within said chamber and occupies a horizontal plane. One end of the actuating-lever $c^7$ projects beneath the rail and is exposed in order that it may be engaged by suitable means on the car and operated to in turn move the switch-arm.

A plate $d$ is set edgewise close to the inside of the rail, the upper edge of which is formed with an intermediate depression $d'$, which is inclined at each end, and with flat portions $d^2$ extending for short distances above the rail in continuation of the inclined portions of the depression. The exposed end of the actuating-lever $c^7$ extends over the depressed portion of the plate and is engaged by a device which engages and follows along on the upper edge of the plate. On the car a vertically-movable plunger-rod $e$ is provided, which is movably supported in suitable guideways, and a spring $e'$ encircles the rod, which acts to thrust it down whenever said spring is permitted to act. The rod has projecting from it a pin $e^2$, which is adapted to be engaged by a latch $e^3$, pivoted at $e^4$ to a suitable bracket provided for it, and an arm $e^5$ extends from said latch, which has at its extremity an upturned portion $e^6$, which extends up through a hole in the floor of the car within easy reach of the motorman. By depressing the arm $e^5$ the latch is caused to release the spring-pressed plunger-rod $e$.

The plunger-rod is so located on the car as to engage the upper edge of the plate whenever released, so as to follow down the inclined wall of the depression $d'$ and along the bottom thereof and engage the exposed end of the actuating-lever $c^7$, and thereby move the switch-arm.

As the plunger-rod leaves the depression $d$ it follows up the inclined wall at the opposite end thereof and by compressing the spring $e'$ moves the pin $e^2$ up into engagement with the latch $e^3$. Thus whenever the motorman desires to move the switch-arm he has but to depress the arm $e^5$ at the proper time to release the spring-pressed plunger-rod.

Having thus described my invention, what I claim as new, and desire to secure by Letters Patent, is—

1. The combination with a pivoted switch-arm, of a cam-grooved disk in engagement therewith, having ratchet-teeth, a pawl in engagement with the ratchet-teeth, a pawl-carrying arm, a pivoted actuating-lever to which said arm is connected and means under the control of the motorman for operating said lever, substantially as described.

2. The combination with a pivoted switch-arm, of a cam-grooved disk in engagement therewith, means for moving said disk intermittently, in the same direction, for moving the switch-arm back and forth, a pivoted actuating-lever having an exposed end, and means, mounted on the car, under the control of the motorman, for engaging the exposed end of said actuating-lever, substantially as described.

3. The combination with a pivoted switch-arm, of a cam-grooved disk in engagement therewith for moving said switch-arm back and forth, means for moving said disk intermittently, an actuating-lever for said means having an exposed end, a plate over which the exposed end of said lever extends, having a depression with inclined end walls, a spring-pressed plunger-rod on the car and means for operating it, substantially as described.

4. The combination with a pivoted switch-arm having a downwardly-extended pin, a cam-grooved disk located beneath said arm, the groove of which receives said pin, a pivoted actuating-lever for said disk having an exposed end, and means mounted on the car, under the control of the motorman, for engaging the exposed end of said actuating-lever, substantially as described.

5. The combination with a pivoted switch-arm, of a device for moving it back and forth on its pivot, a pivoted actuating-lever connected with said device having an exposed end, a plate over which the exposed end of said lever extends, having a depression with inclined end walls, and means mounted on the car, under the control of the motorman, for engaging the exposed end of said lever, and a locking device for said means, substantially as described.

6. The combination with a pivoted switch-arm, of a device for moving it back and forth on its pivot, a pivoted actuating-lever connected with said device having an exposed end, a plate over which the exposed end of said lever extends, having an intermediate depression with inclined end walls and flat surfaces in continuation of said end walls, a plunger-rod on the car, under the control of the motorman, which is adapted to engage the said plate and to move said lever as it passes along on the plate, and a locking device for said plunger, substantially as described.

7. The combination with a pivoted switch-arm, of a device for moving it back and forth on its pivot, a pivoted actuating-lever connected with said device having an exposed end, a plate over which the exposed end of said lever extends, having an intermediate depression with inclined end walls, and flat surfaces in continuation of said end walls, a spring-pressed plunger mounted on the car adapted to engage the said plate and a locking-lever for said plunger, adapted to be operated by the motorman to release the plunger, substantially as described.

8. The combination with a pivoted switch-arm, of a device for moving it back and forth on its pivot, a pivoted actuating-lever connected with said device having an exposed end, a plate over which the exposed end of said lever extends having an intermediate depression with inclined end walls and flat surfaces in continuation of said end walls, a spring-pressed plunger mounted on the car adapted to engage the said plate, and a locking device into engagement with which said plunger is moved by the inclined wall of the plate, substantially as described.

9. The combination with a pivoted switch-arm having a downwardly-extended pin, a cam-grooved disk located beneath said arm, the groove of which receives said pin, and means for intermittingly moving said disk in the same direction, for moving said switch-arm back and forth, substantially as described.

In testimony whereof I have signed my name to this specification in the presence of two subscribing witnesses.

WILLIAM P. O'BRIEN.

Witnesses:
WILLIAM F. CASS,
JOSEPH E. DALEY.